(12) United States Patent
Phan et al.

(10) Patent No.: US 10,961,978 B2
(45) Date of Patent: Mar. 30, 2021

(54) TURBINE UNIT FOR HYDRAULIC INSTALLATION

(71) Applicant: GE RENEWABLE TECHNOLOGIES, Grenoble (FR)

(72) Inventors: Hai Trieu Phan, Saint Martin d'Hères (FR); Fabrice Loiseau, Sassenage (FR); Antoine Bombenger, Echirolles (FR)

(73) Assignee: GE Renewable Techologies, Grenoble (FR)

( * ) Notice: Subject to any disclaimer, the term of this patent is extended or adjusted under 35 U.S.C. 154(b) by 512 days.

(21) Appl. No.: 15/546,579

(22) PCT Filed: Jan. 21, 2016

(86) PCT No.: PCT/EP2016/051200
§ 371 (c)(1),
(2) Date: Jul. 26, 2017

(87) PCT Pub. No.: WO2016/120145
PCT Pub. Date: Aug. 4, 2016

(65) Prior Publication Data
US 2017/0370343 A1 Dec. 28, 2017

(30) Foreign Application Priority Data
Jan. 30, 2015 (EP) .................................... 15290022

(51) Int. Cl.
F03B 15/06 (2006.01)
F03B 3/14 (2006.01)
(Continued)

(52) U.S. Cl.
CPC ................ F03B 15/06 (2013.01); F03B 3/06 (2013.01); F03B 3/14 (2013.01); F03B 11/006 (2013.01);
(Continued)

(58) Field of Classification Search
CPC .......... F03B 11/006; F03B 11/04; F03B 3/06; F03B 3/14; F03B 15/06; Y02E 10/223; F05B 2220/32
See application file for complete search history.

(56) References Cited

U.S. PATENT DOCUMENTS 2,378,958 A 6/1945 Troller
2,776,107 A 1/1957 Willi
(Continued)

FOREIGN PATENT DOCUMENTS

WO WO-0161185 A1 * 8/2001 ................ F03B 3/06

OTHER PUBLICATIONS

Extended European Search Report and Opinion issued in connection with corresponding EP Application No. 15290022.1 dated Jul. 21, 2015.
(Continued)

Primary Examiner — Michael Lebentritt
Assistant Examiner — Jesse M Prager
(74) Attorney, Agent, or Firm — Dority & Manning, P.A.

(57) ABSTRACT

A turbine unit for a hydraulic installation, and more in particular it deals with the hub of the turbine unit. The present invention proposes to provide means for adjusting a gap extent formed between the hub and the inner edge of the blade, this way dramatically increasing the performance of the turbine.

8 Claims, 10 Drawing Sheets

(51) Int. Cl.
*F03B 3/06* (2006.01)
*F03B 11/00* (2006.01)
*F03B 11/04* (2006.01)

(52) U.S. Cl.
CPC .......... *F03B 11/04* (2013.01); *F05B 2220/32* (2013.01); *Y02E 10/20* (2013.01)

(56) References Cited

U.S. PATENT DOCUMENTS

| | | |
|---|---|---|
| 3,026,085 A | 3/1962 | Whippen et al. |
| 5,947,679 A | 9/1999 | Cybularz et al. |
| 5,954,474 A * | 9/1999 | Fisher, Jr. .................. F03B 3/06 29/889.2 |
| 10,385,720 B2 * | 8/2019 | Teixeira .................. F01D 5/186 |
| 2014/0140822 A1 * | 5/2014 | Capozzi .................... F01D 9/00 415/160 |

OTHER PUBLICATIONS

International Search Report and Written Opinion issued in connection with corresponding PCT Application No. PCT/EP2016/051200 dated Mar. 31, 2016.

International Preliminary Report on Patentability issued in connection with corresponding PCT Application No. PCT/EP2016/051200 dated Aug. 1, 2017.

* cited by examiner

TURBINE UNIT FOR HYDRAULIC INSTALLATION

TECHNICAL FIELD

Embodiments of the invention general relate to a turbine unit for a hydraulic installation, and more in particular it deals with the hub of the turbine unit.

BACKGROUND

Hydraulic installations using double-regulated-type turbines (such as Kaplan or Bulb or Deriaz turbines) are nowadays widely known and used. In this kind of installations the turbine comprises a hub onto which several blades are fitted. The rotation of the hub about its longitudinal axis caused by the interaction of the flow of water and the blades determines the production of electricity, as the hub is suitably connected to an electric generator. Furthermore, each turbine blade is pivotally connected to the hub such to be rotatable about an axis which extends substantially perpendicular to the hub. The regulation of the angular position of the blade relative to the hub is used to improve the efficiency of the energy-conversion process. It is also well known that between the inner edge of the blade and the hub a gap is created. It is a common conception that such gaps create detrimental effects, as they may cause cavitation and/or may kill or injure fishes as they might be sucked and directed through the gap.

U.S. Pat. No. 5,947,679 addresses such problem providing a turbine for hydraulic installations having the feature of being fish-friendly. To this aim, with specific reference to column 7 lines 1-26 and FIG. 21, U.S. Pat. No. 5,947,679 proposes to insert raised areas between the blade and the surface of the hub to shield the gaps. Therefore, the aim of the teaching of said patent is to provide a turbine where the extent of the gap is reduced to zero or at least minimised to a constant value such to improve the survivability of fishes.

With reference to FIG. 1, it is schematically shown the geometry of such arrangement belonging to the prior art, given in terms of extent, or size, of a gap formed between the raised area and an inner edge of the blade as a function of angle $\alpha$, which represents the angular position of blade when rotated versus the hub. In particular, the graph shows that the shape of the outer surface of the raised area is such that the extent of the gap, as a function of the blade angle $\alpha$, has a constant value.

SUMMARY OF THE INVENTION

However, it has been found within the research conducted which led to embodiments of the present invention that, at a given angular position of the blade, the gap extent existing between the blade and the hub enables the control of the velocity field at the runner outlet close to the hub. Said differently, the velocity field can be improved with an appropriate gap extent, to reduce the draft tube head loss and improving the turbine efficiency. Furthermore, other advantages have been achieved concerning cavitation, pressure fluctuations, torques on blades, Karman phenomenon.

Therefore, embodiments of the present invention propose to provide means for adjusting the gap extent formed between the hub and the inner edge of the blade, this way dramatically increasing the performance of the turbine.

It is an object of embodiments of the present invention to solve the aforementioned technical problems by providing a hub for a turbine of a hydraulic installation. The hub defines a longitudinal axis H and is configured to be connected to at least a blade. The hub comprising at least a raised area and/or a hollow area, said raised area or hollow area being locally formed in proximity of an inner edge of the at least one blade, wherein the hub further comprises adjustment means configured to regulate the extent of a gap formed between said raised area or hollow area and the inner edge of the blade.

It is a further object of embodiments of the present invention to provide a turbine for a hydraulic installation wherein said adjustment means comprises an ejection/withdraw mechanism associated to said raised area configured to eject/withdraw said raised area from/in said hub such to regulate the extent of said gap.

It is a further object of embodiments of the present invention to provide a hydraulic installation comprising a hub defining a longitudinal axis H and being configured to be connected to at least a blade. The hub comprising at least a raised area and/or a hollow area, said raised area or hollow area being locally formed in proximity of an inner edge of the at least one blade. The hub further comprises adjustment means configured to regulate the extent of a gap formed between said raised area or hollow area and the inner edge of the blade and one or more blades connected to said hub.

Aspects of the present invention are defined in correspondent dependent claims.

According to an aspect of the invention, this object is obtained by a hub defining a longitudinal axis and configured to be connected to at least a blade, wherein the hub comprises at least raised area and/or a hollow area, the raised area or the hollow area being locally formed in proximity of an inner edge of the blade, the hub further comprising adjustment means configured to regulate the extent of a gap formed between the raised area or the hollow area and the inner edge of the blade.

According to an aspect of the invention, the hub comprises upstream and downstream regions, wherein the raised area or the hollow area is formed on the downstream region.

According to an aspect of the invention, the hub is pivotally connected to the blade, the angular position of the blade being defined by an angle $\alpha$ formed between a chord line of the blade and an axis A perpendicular to the longitudinal axis of the hub, the raised area defining an outer surface being shaped such that the extent of the gap is variable for at least for two angular positions of the blade.

According to an aspect of the invention, the outer surface is shaped such that the extent of the gap as a function of the blade angle $\alpha$ has a curved line trend with a minimum.

According to an aspect of the invention, the outer surface is shaped such that the extent of the gap as a function of the blade angle $\alpha$ has a trend comprising a first constant segment followed by a second increasing segment.

According to an aspect of the invention, the outer surface is shaped such that the extent of the gap as a function of the blade angle $\alpha$ has an increasing line trend.

According to an aspect of the invention, the outer surface is shaped such that the extent of the gap as a function of the blade angle $\alpha$ has a decreasing line trend.

According to an aspect of the invention, the outer surface is shaped such that the extent of said gap as a function of the blade angle $\alpha$ has a curved line trend with at least a local minimum and a local maximum.

According to an aspect of the invention, the blade is movable between a minimum angle $\alpha_{min}$ and a maximum angle $\alpha_{max}$.

According to an aspect of the invention, for at least one angular position of the blade the outer surface of the raised area is shaped such that the extent of the gap is variable along the inner edge of the blade.

According to an aspect of the invention, the extent of the gap as a function of the inner edge of the blade for at least one angular position of the blade comprises a first constant portion followed by a second increasing portion.

According to an aspect of the invention, the adjustment means comprises a rotative mechanism associated to the downstream or upstream regions of the hub and configured to rotate the downstream region relative to the upstream region, or vice versa, about the longitudinal axis, such to move the raised area relative to the blade.

According to an aspect of the invention, the adjustment means comprises an ejection/withdraw mechanism associated to the raised area and configured to eject/withdraw the raised area from/in the hub such to regulate the extent of the gap.

BRIEF DESCRIPTION OF THE DRAWINGS

Embodiments of the present invention will become more apparent upon reading of the following non-restrictive description of embodiments thereof, given for the purpose of exemplification only, with reference to the accompany drawing, through which similar reference numerals may be used to refer to similar elements, and in which.

Embodiments of the present invention will be now described with reference to the aforementioned drawings.

DETAILED DESCRIPTION OF THE INVENTION

Figure 1:
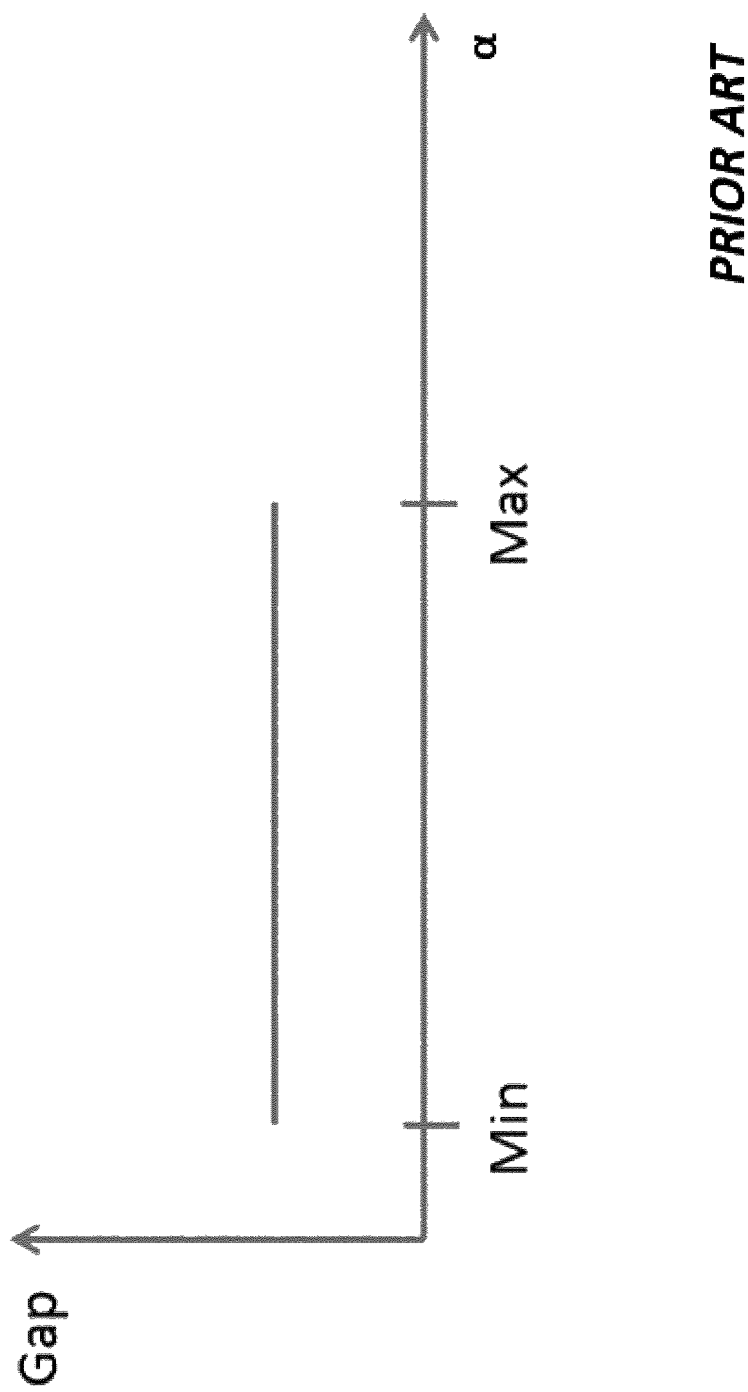
FIG. 1 shows the geometry of an arrangement of a turbine unit having a hub and one blade connected thereto according to the prior art.
Figure 2:
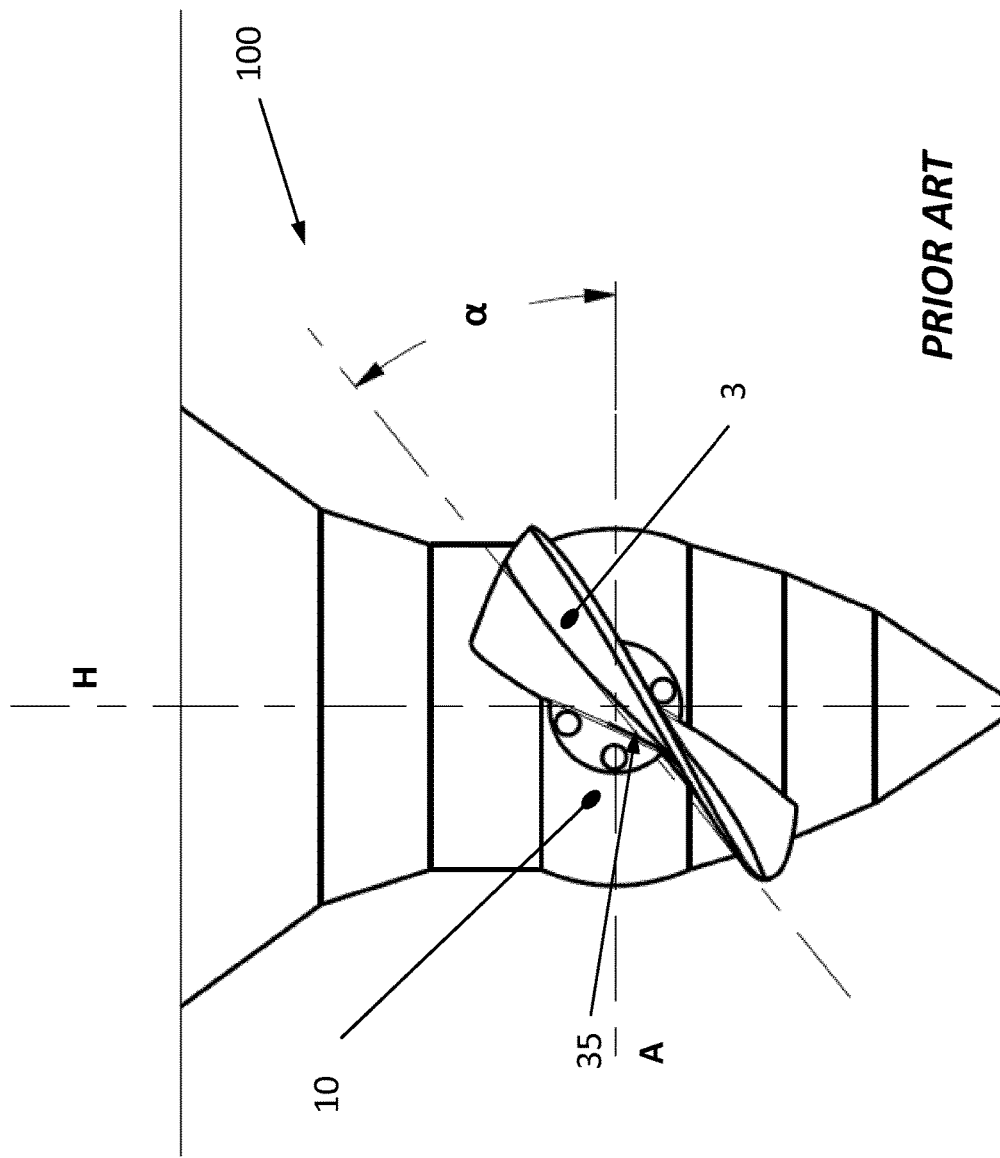
FIG. 2 shows a frontal view of a turbine unit comprising a hub and one blade connected thereto according to the prior art.

With reference to FIG. 2, it is generally shown a turbine unit, indicated with reference numeral 100, according to the prior art. The turbine 100 comprises a hub unit 10 configured to rotate about its longitudinal axis H. The rotation of the hub is enabled by a plurality of blades which are connected thereto and elaborate a flow of water typically directed in the direction of the axis H. Hub 10 is integral to a shaft which is in turn connected to an electric generator (components not pictured) for the production of electricity. The figure depicts hub 10 comprising one blade 3, but it will be readily understood by those who are skilled in the art that hub 10 may comprise a plurality of blades, evenly distanced around its outer diameter. More in particular, blade 3 is pivotally connected to hub 10 such that its angular position may be defined by an angle α formed between an axis A, perpendicular to longitudinal axis H, and a chord 35 of the blade. The angle of blade 3 may be suitably regulated during operation as a function of numerous variables of the ongoing process, such as, for example, the water flow and its velocity field. More in particular, blade 3 may typically be rotated from a minimum angle $α_{min}$, where the blade 3 is almost aligned with axis A, to a maximum angle $α_{max}$. A top view of blade 3 is shown in next FIG. 3. Blade 3 is pivotally connected to the hub (not depicted) and rotatable about an axis R. In the exemplary embodiment, herewith described as a non-limiting example, axis R is substantially perpendicular to longitudinal axis H; however it will be appreciated that the rotational axis R may alternatively be disposed along any orientation. The blade 3 comprises a leading edge portion 34, a trailing edge portion 32, an outer edge 33 and an inner edge 31.

Figure 3:
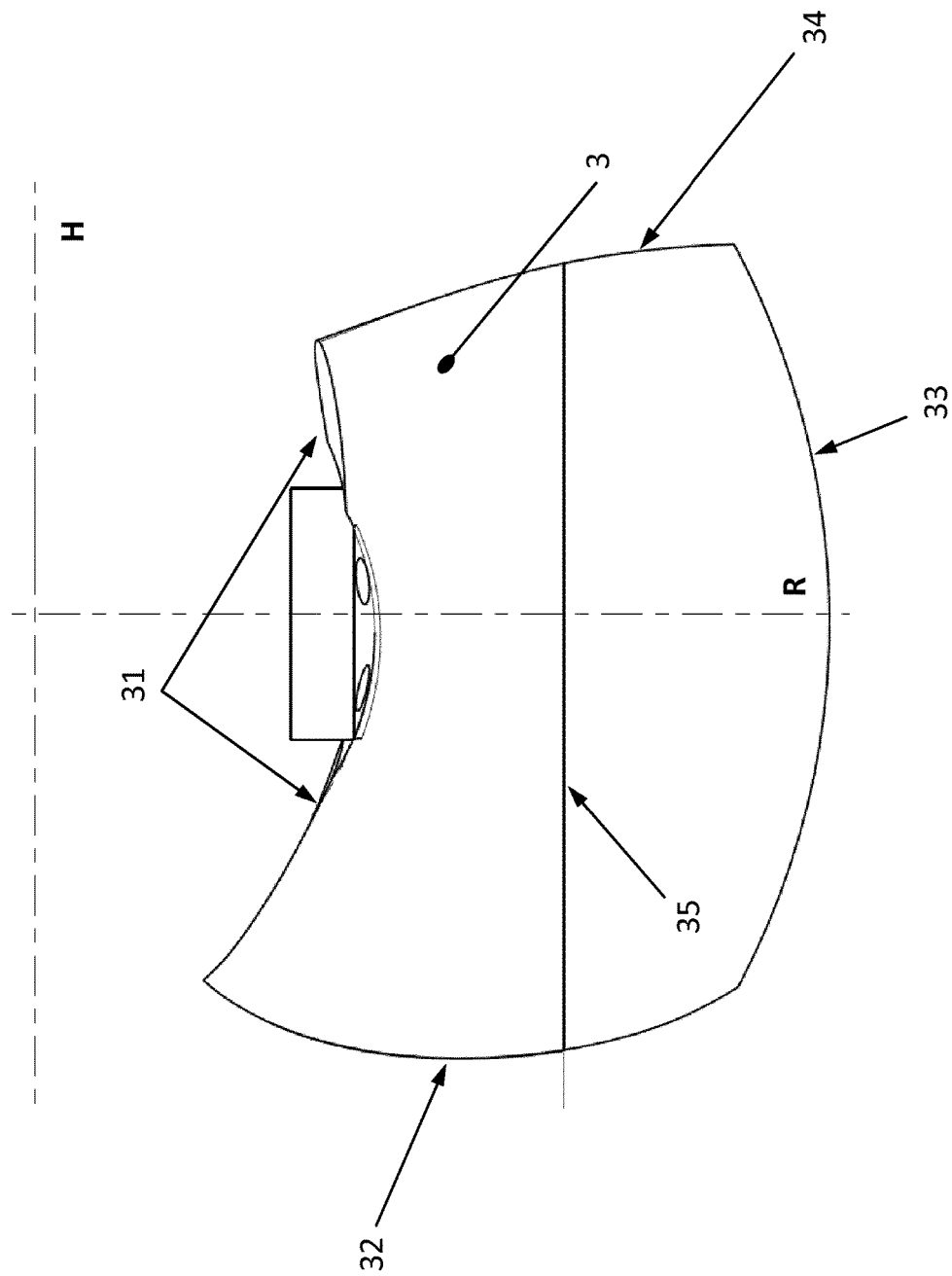
FIG. 3 shows a plan view of the blade of FIG. 1.
Figure 4:
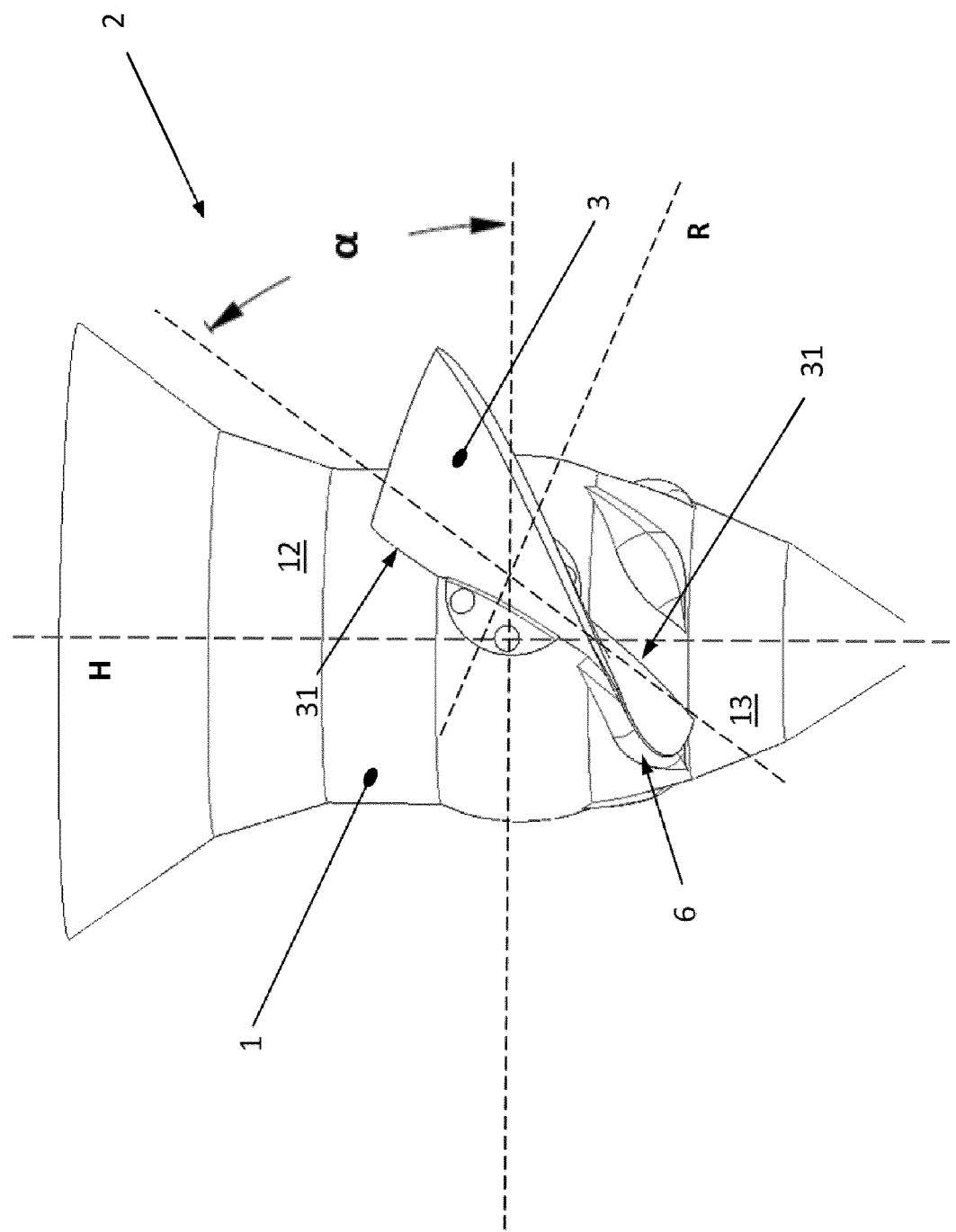
FIGS. 4 and 5 show a turbine unit comprising a hub with raised area and one blade connected thereto.

Making now reference to the following FIG. 4, it is shown a turbine unit 2 according to embodiments of the present invention. Turbine unit 2 includes a hub 1 and several blades 3 connected thereto (only one is depicted for sake of clarity such to ensure the legibility of the drawing). Blade 3 of FIG. 3 corresponds to the blade described with reference to preceding FIG. 2.

More in particular, hub 1 comprises upstream and downstream regions 12 and 13 and, for each blade 3, a raised area 6 locally formed on the hub and proximate to the inner edge 31 of the blade 3. In the exemplary embodiment here described, raised area 6 is arranged on the downstream region 13 of the hub. However, in the same way, raised areas may be arranged alternatively or additionally on the upstream region 12, in proximity of the inner edge 31 of the blade 31. A gap is then formed between the inner edge 31 of the blade 3 and the raised area 6. In an embodiment, hub 1 comprises adjustment means configured to regulate the extent of the gap for an angular position α of the blade 3 versus the hub 1. In this way, an improved performance of the turbine is achieved, the gap being regulated depending on the operative conditions.

Furthermore, embodiments of the present invention are not only limited to forming raised areas on the hub associated to the adjustment means configured to regulate the extent of the gap. Alternatively or additionally, hub may be provided with hollow, or dip, areas. In the same way, the hollow area is locally formed in the proximity of the inner edge 31 of the blade 3. The following non-limiting examples herewith described are directed to a hub comprising raised areas only. However, it is to be considered to be within the competence and customary knowledge of those who are skilled in the art the necessary skills to implement on the hub hollow areas as well. In particular, the depth of the hollow area may be adjusted to regulate the gap extending between the hollow area and the inner edge of the blade.

So, generally, embodiments of the present invention provide a hub with raised areas and/or hollow areas, each one locally formed in the proximity of the inner edge of a blade, the raised areas and/or hollow areas being distributed on the hub body on the downstream region and/or the upstream region.

Figure 5:
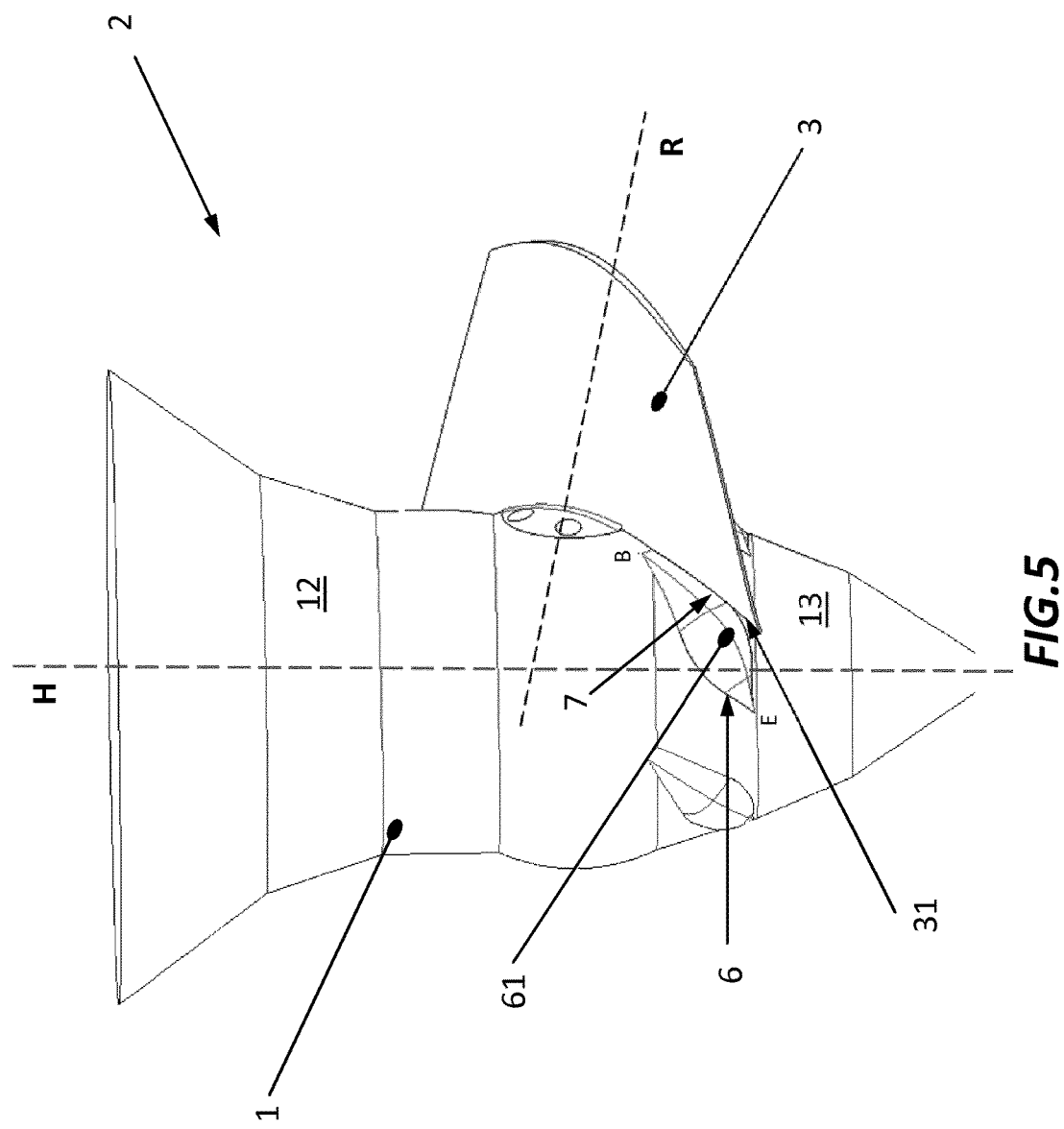

Making now reference to next FIG. 5, it is showed hub 1 of FIG. 3 after an approximate 45° counterclockwise rotation around H axis. Blade 3 is pivotally connected to hub 1 such to be rotatable about the axis R, which is, in this non-liming example, substantially perpendicular to the external surface of the hub 1. Therefore blade 3 may be arranged with different angular positions. As clearly indicated in the figure, the rotation of the blade 3 about axis R involves the displacement of inner edge 31 along different portions of raised area 6. According to a first exemplary embodiment, raised area 6 defines an outer surface 61 which has a geometry shaped such that the extent of the gap 7 formed between the outer surface 61 and inner edge 61 is variable, for at least two angular positions of the blade. In an embodiment, the arrangement of outer surface 61 is such that for each angular position of the blade, indicated by the value of angle α (not pictured), there is a correspondence to the extent of the gap 7 formed between the raised area 6 and inner edge 31 of the blade. As explained above, the variance of gap 7, and therefore its control by adjustment means, allows for a fine tuning of the turbine unit 2 in order to maximize its hydraulic performance. Depending on the particular applicative scenario where the hydraulic installation is arranged, different kind of geometries for outer surface 61 may be required in order to optimize efficiency of the process.

Figure 6:
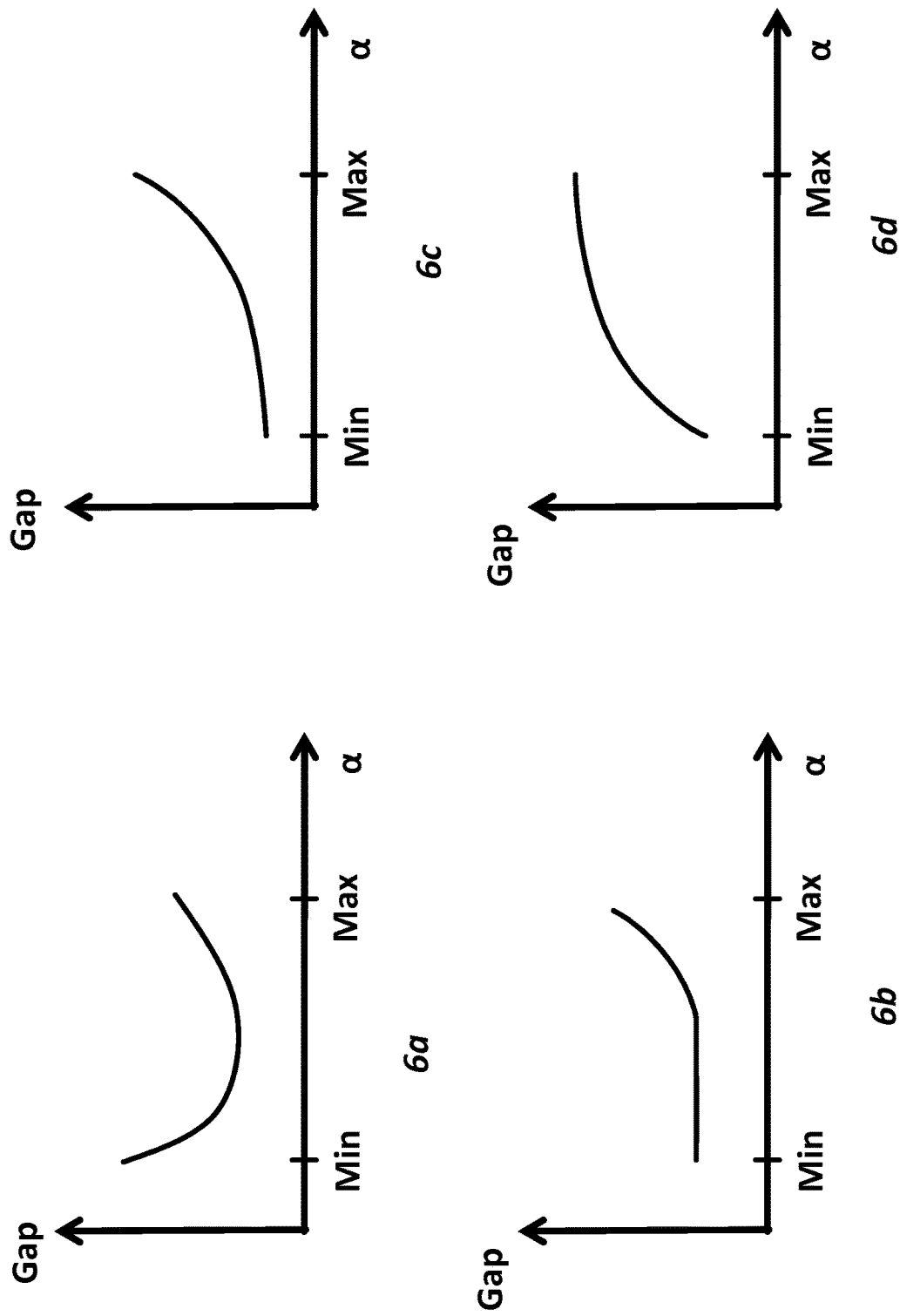
FIGS. 6 and 7 show diagrams representing different examples of the resulting gap formed between the inner edge of the blade and the raised area, as a function of the angular positions α of the blade.
Figure 7:
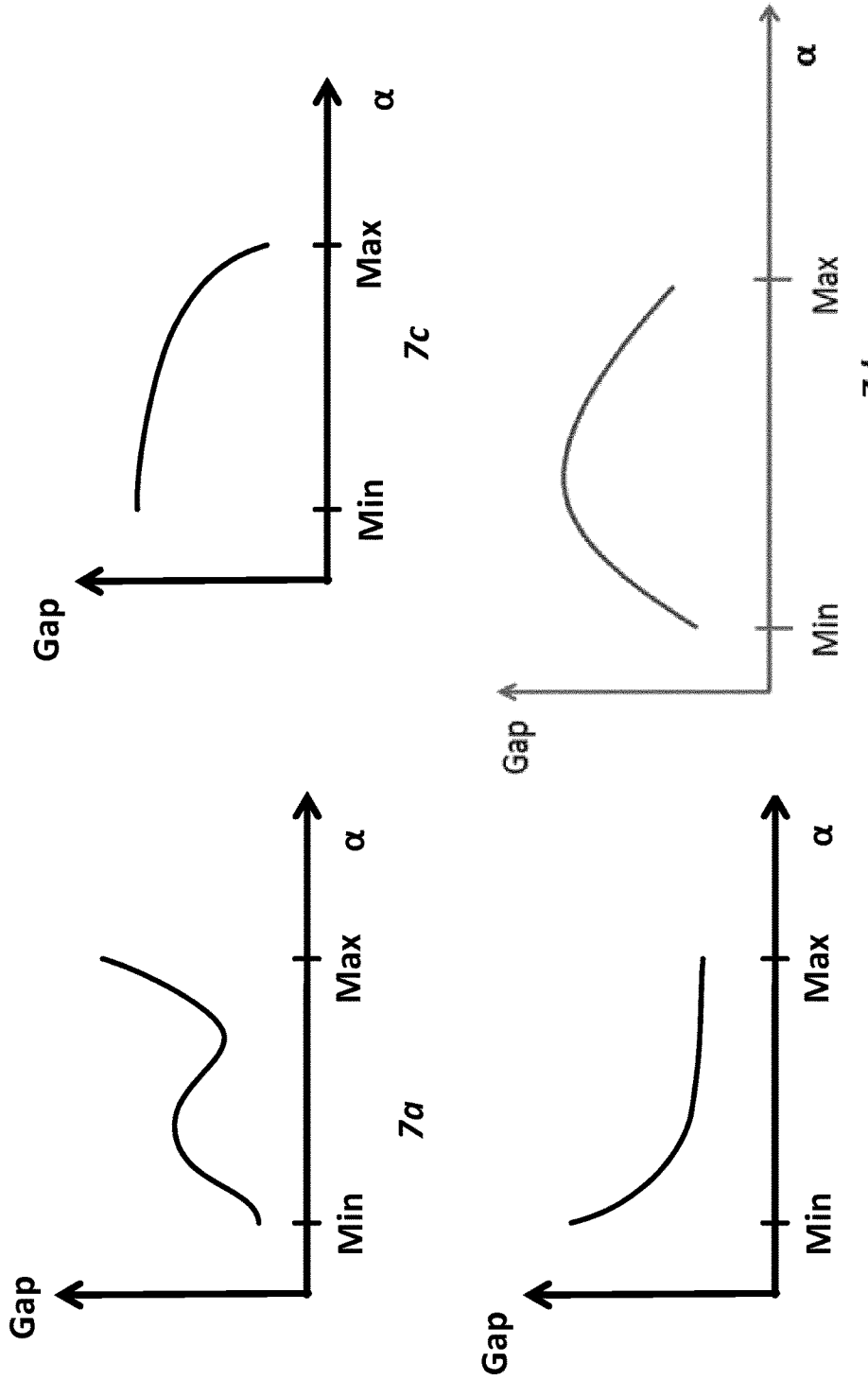

Next FIGS. 6 and 7 illustrate different examples of geometries given in terms of extent, or size, of the gap 7 between raised area 6 and inner edge 31 of the blade 3 as a function of angle α representing the angular position of blade 3 when rotated about axis R.

In particular, with reference to FIG. 6a, it is shown a graph representing a shape of the outer surface of the raised area such that the extent of the gap, as a function of the blade angle α, has a curved line trend with a minimum. Said differently, when the blade is positioned at the minimum angle $\alpha_{min}$ (that is oriented almost along axis A), the extent of the gap formed between the raised area and inner edge of the blade has a maximum value. Then it starts decreasing until it reaches a minimum. After that the extent of the gap, in other words the spatial distance between the outer surface of the raised area and the inner edge of the blade, starts increasing again until the blade is rotated to the maximum angle $\alpha_{max}$. In this case, the outer surface can be regarded as hill-shaped, and this kind of geometry is the one substantially pictured in FIGS. 3 and 4. However, other geometries may be used as well.

FIG. 6b shows a graph describing a shape of the outer surface of the raised area such that the extent of the gap as a function of the blade angle α has a trend comprising a first constant segment followed by a second increasing segment.

FIGS. 6c and 6d graphs show examples where the outer surface is shaped such that the extent of the gap as a function of the blade angle α has an increasing line trend.

FIGS. 7b and 7c graphs shows examples where the outer surface is shaped such that the extent of the gap as a function of the blade angle α has a decreasing line trend.

FIG. 7a, conversely, shows an exemplary geometry where the extent of the gap as a function of the blade angle α has a curved line trend with at least a local minimum and a local maximum.

Lastly, FIG. 7d shows a further example of a geometry wherein the shape of the outer surface of the raised area is such that the extent of the gap, as a function of angle α, is represented by a curved line with a maximum.

It will be readily understood by those who are skilled in the art that the invention will not be limited to the exemplary geometries of the raised area above described, but other geometries may be considered depending on the particular working conditions in which the turbine unit may operate.

Figure 8:
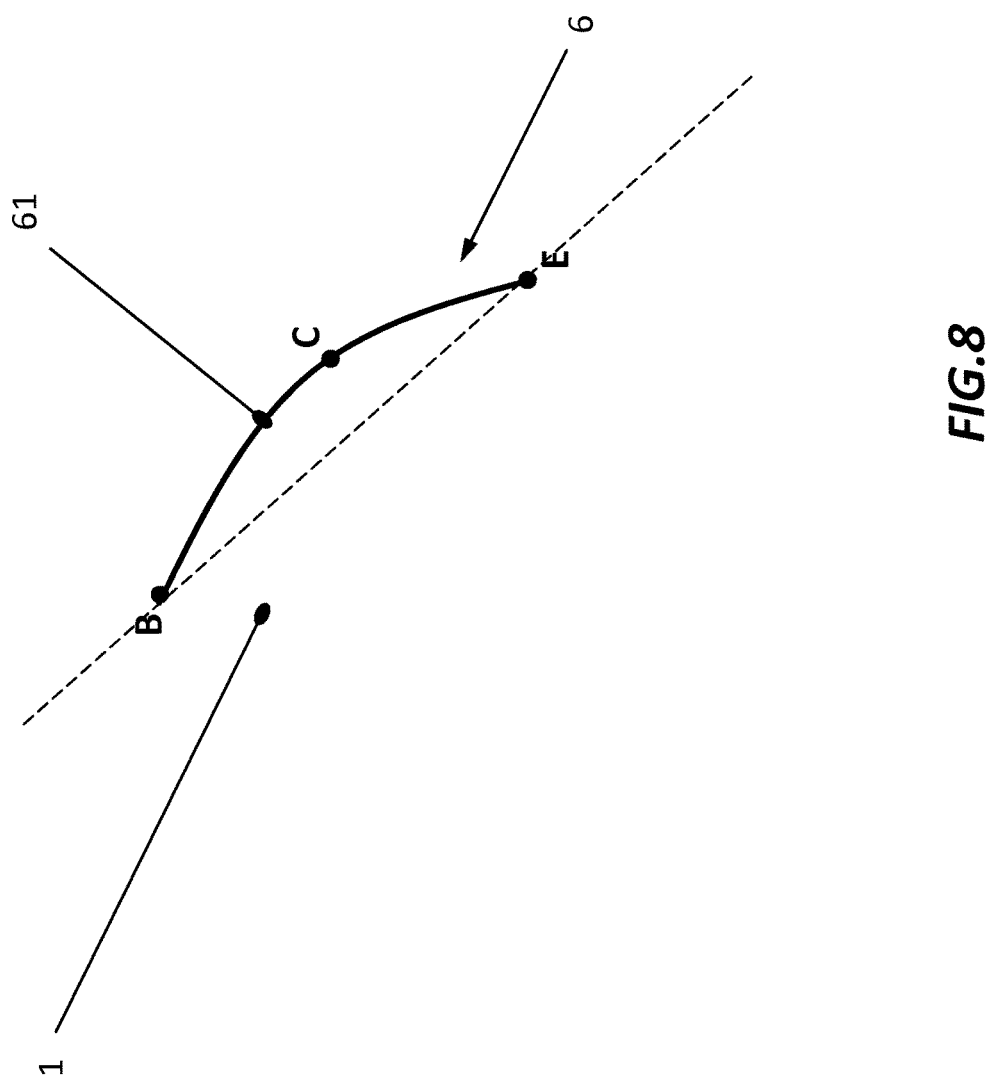
FIG. 8 shows a schematic lateral view of the hub, particularly showing an example of geometry of the raised area.

Furthermore, making now reference to following FIG. 8, the geometry of outer surface 61 of raised area 6 may be such that the extent of the gap between the raised area and the inner edge of the blade (not shown) may be variable along the inner edge of the blade, once the blade has reached an operative angular position. More in particular, FIG. 7 shows a lateral cross section of the raised area 6 such that the extent of the gap between outer surface 61 and the inner edge of the blade (not shown) is constant from position B to C, and then increases from position C to E.

Figure 9:
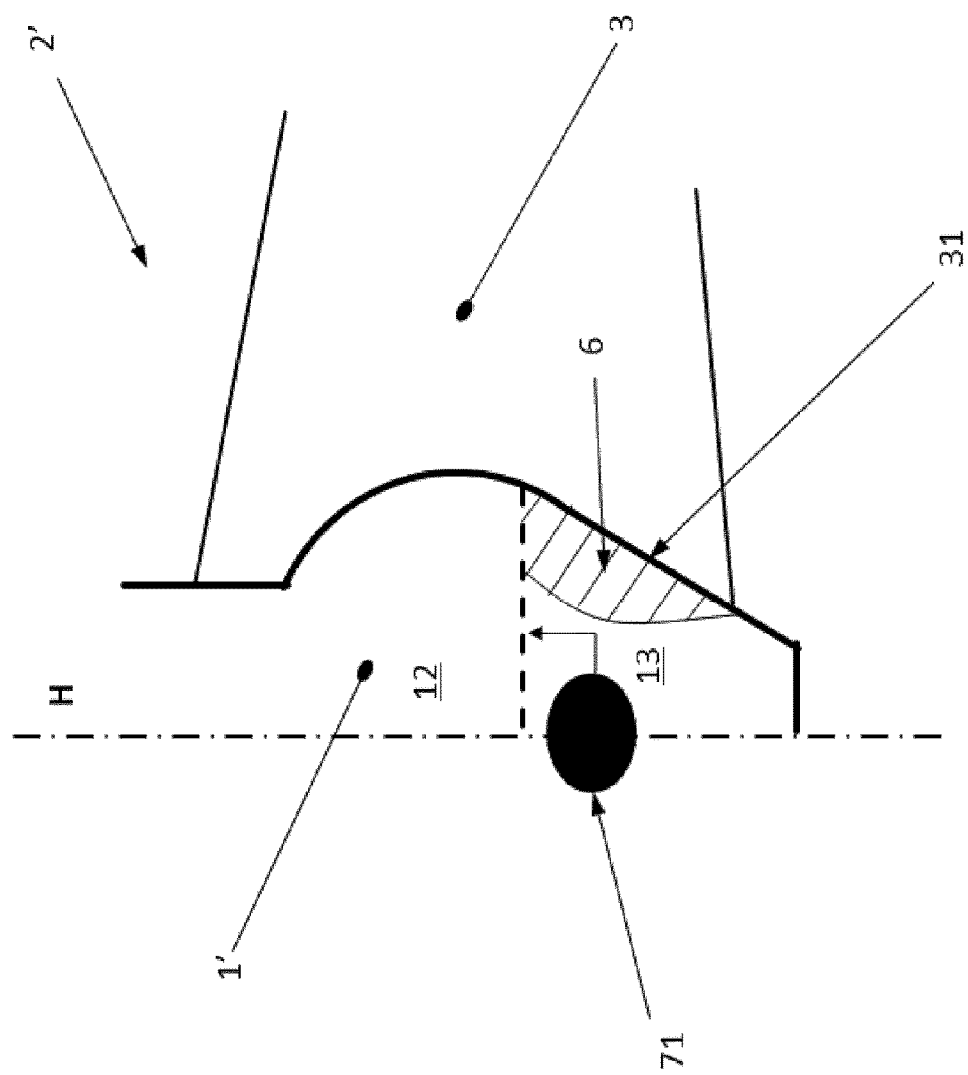
FIG. 9 schematically depicts the turbine unit.

Making now reference to following FIG. 9, it is shown a turbine unit 2' according to embodiments of the present invention, comprising hub 1'. In particular, in this case, adjustment means includes a rotative mechanism, schematically depicted and indicated with numeral reference 71, associated to downstream region 13 of the hub 1' and configured to rotate the downstream region 13 relative to upstream region 12 about longitudinal axis H. For a given blade angle, the rotation of the downstream region 13 occurs relative to the blade 3 such to rotate raised area 6 with respect to the blade 3 in equivalent manner as for the rotation of the blade 3 relative to hub 1'. Therefore, because of the geometry of the outer surface of raised area 6, the rotation of downstream portion 13 determines the adjustment of the extent of the gap formed between raised area and inner edge of the blade. Conversely, in case raised areas are positioned on the upstream region of the hub, the rotative mechanism may be, alternatively or additionally, arranged to rotate upstream region 12 relative to downstream region 13.

In this exemplary embodiment, downstream and upstream regions of hub 1' are two separate portions movable relative to each other. Moreover, hub 1' is hollow inside so that rotative mechanism 71 can be housed therein.

Figure 10:
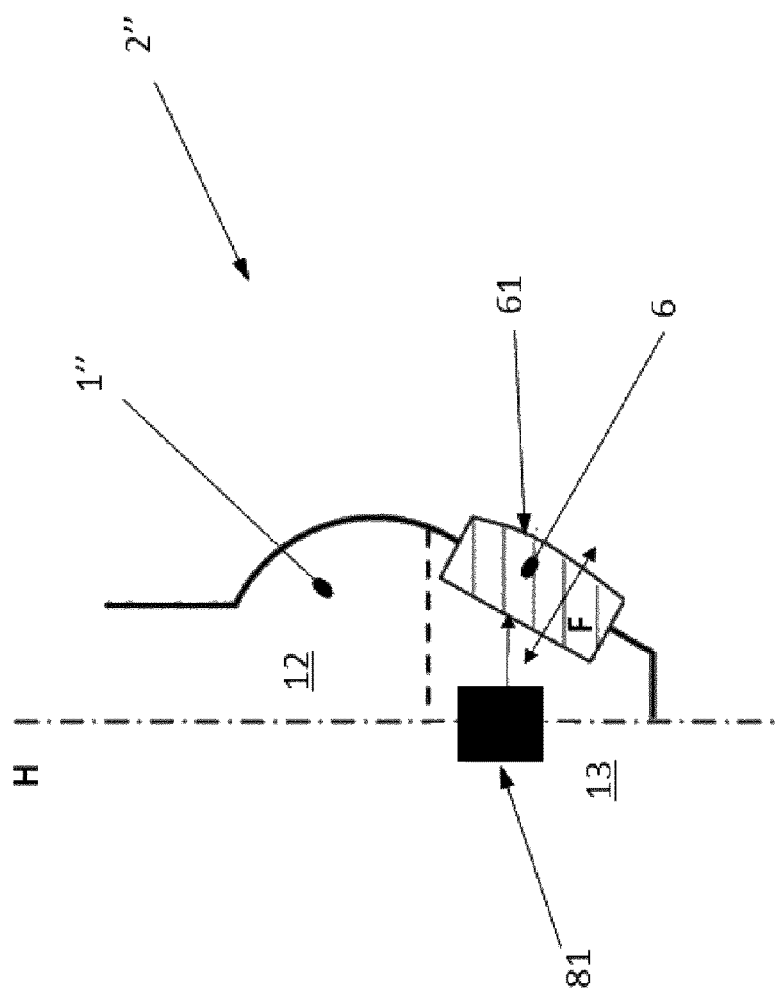
FIG. 10 schematically depicts the turbine unit.

Moving to next and last FIG. 10, it is shown a turbine unit 2", including a hub 1", according to an embodiment. In this embodiment, adjustment means comprises an ejection/withdrawn mechanism, schematically depicted and indicated with numeral 81, associated to raised area 6 and configured to eject or withdraw the raised area 6 relative to downstream region 13, or more in general to the hub 1". The ejection or the withdrawn of the raised area occurs along a direction which is substantially perpendicular to the surface of the hub, indicated by arrows F in the figure. However, the displacement of the direction may also not be perpendicular to the hub. By ejecting the raised area, outer surface 61 approaches inner edge of the blade (not shown), and, conversely, when raised area 6 is withdrawn towards the inside of the hub 1", the gap extent is increased. By acting on mechanism 81 the extent of the gap can be advantageously controlled and fine-tuned during operation of the machine. Ejection/withdrawn mechanism 81 may be hosted inside hub 1" as well. It will be readily appreciated that rotative and ejection/withdraw mechanisms may also be integrated into a single mechanism, capable of carrying out both operations.

Raised areas may be formed on the hub as raised area portions, which could be achieved, for example, by a moulding process. Hollow areas, on the other hand, may be achieved, as a non-limiting example, by a machining process.

It will also be readily appreciated that embodiments of the present invention may present all the features pertaining to the embodiments above described in any combination. Therefore, it is conceivable to provide the hub with all the characteristics of the embodiments, to maximise the manoeuvrability of the gap extending between the raised area and the blade.

While embodiments of the invention have been described in detail in connection with only a limited number of embodiments, it should be readily understood that embodiments of the invention are not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A hub of a turbine for a hydroelectric installation, comprising:
   at least one of a raised area and a hollow area, the hub defining a longitudinal axis H and configured for connecting to at least one blade, said raised area or hollow area being locally formed in proximity of an inner edge of the at least one blade,
   wherein the hub further comprises adjustment means configured to regulate the extent of a gap formed between said raised area or hollow area and the inner edge of the at least one blade for an angular position of said at least one blade with respect to the hub,
   wherein said raised area or said hollow area define an outer surface being shaped such that the extent of said gap is variable for at least two angular positions of the at least one blade, and wherein the outer surface is shaped such that the extent of said gap as a function of a blade angle $\alpha$ has at least one of a decreasing line trend or a curved line trend with at least a local minimum and a local maximum.

2. The hub of claim 1, further comprising upstream and downstream regions, wherein said raised area or hollow area is formed on said downstream region.

3. The hub of claim 1, wherein the hub is configured to be pivotally connected to the at least one blade, the angular position of the at least one blade being defined by the blade angle $\alpha$ formed between a chord line of the at least one blade and an axis A perpendicular to the longitudinal axis H of said hub.

4. The hub of claim 3, wherein the at least one blade is movable between a minimum angle $\alpha_{min}$ and a maximum angle $\alpha_{max}$.

5. The hub of claim 3, wherein for at least one angular position of the at least one blade, the outer surface of the raised area is shaped such that the extent of said gap is variable along the inner edge of the at least one blade.

6. The hub of claim 5, wherein the extent of said gap as a function of the inner edge of the at least one blade for at least one angular position of the at least one blade comprises a first constant portion followed by a second increasing portion.

7. A turbine unit for a hydroelectric installation, comprising:
   a hub defining a longitudinal axis H, the hub configured for connecting to at least a blade, said hub comprising at least one of a raised area and a hollow area, said raised area or hollow area being locally formed in proximity of an inner edge of the at least one blade,
   wherein the hub further comprises adjustment means configured to regulate the extent of a gap formed between said raised area or hollow area and the inner edge of the at least one blade and one or more blades connected to said hub for an angular position of said at least one blade with respect to the hub,
   wherein said raised area or said hollow area define an outer surface being shaped such that the extent of said gap is variable for at least two angular positions of the at least one blade, and wherein the outer surface is shaped such that the extent of said gap as a function of a blade angle $\alpha$ has at least one of a decreasing line trend or a curved line trend with at least a local minimum and a local maximum.

8. The turbine unit of claim 7, wherein the turbine unit is associated with a hydroelectric installation.

* * * * *